US011252465B2

(12) United States Patent
Lyiurov

(10) Patent No.: US 11,252,465 B2
(45) Date of Patent: Feb. 15, 2022

(54) AUTOMATED DATA MANAGEMENT SYSTEM IN A SMART TELEVISION

(71) Applicant: Denys Ihorovych Lyiurov, Mariupol (UA)

(72) Inventor: Denys Ihorovych Lyiurov, Mariupol (UA)

( * ) Notice: Subject to any disclaimer, the term of this patent is extended or adjusted under 35 U.S.C. 154(b) by 0 days.

(21) Appl. No.: 17/059,296

(22) PCT Filed: Dec. 29, 2018

(86) PCT No.: PCT/UA2018/000143
§ 371 (c)(1),
(2) Date: Nov. 27, 2020

(87) PCT Pub. No.: WO2020/009681
PCT Pub. Date: Jan. 9, 2020

(65) Prior Publication Data
US 2021/0144430 A1    May 13, 2021

(30) Foreign Application Priority Data
Jul. 6, 2018   (UA) .............................. A 2018 07572

(51) Int. Cl.
*H04N 21/2187* (2011.01)
*H04N 21/426* (2011.01)
(Continued)

(52) U.S. Cl.
CPC ... *H04N 21/42684* (2013.01); *H04N 21/2187* (2013.01); *H04N 21/4223* (2013.01); *H04N 21/4314* (2013.01); *H04N 21/4436* (2013.01)

(58) Field of Classification Search
None
See application file for complete search history.

(56) References Cited

U.S. PATENT DOCUMENTS 7,895,445 B1 * 2/2011 Albanese .............. G06F 21/335
713/185
8,266,690 B2    9/2012 Victor
(Continued)

FOREIGN PATENT DOCUMENTS

| EP | 0760583 A2 | 3/1997 |
|---|---|---|
| EP | 2202947 A1 | 6/2010 |
| RU | 2621899 C2 | 6/2017 |

OTHER PUBLICATIONS

The State Enterprise "Ukrainian Intellectual Property Institute", International Search Report and Written Opinion of the International Searching Authority, dated Mar. 28, 2019, Kyiv, Ukraine.

*Primary Examiner* — William J Kim
(74) *Attorney, Agent, or Firm* — Louis Ventre, Jr.

(57) ABSTRACT

An automated data management system in a smart television comprises at least one TV set (2) that is equipped with a TV set processor device (6). The latter is connected to the server (10) that is configured to exchange data with said TV set processor device. Web-cameras (13) are provided, which are configured to send a signal with a streaming video to the server (10) in a real time. Upon receipt of a service message about the fact that the TV set (2) is in a standby mode from the TV set processor device (6), a server processor device (14) is configured to send a signal from the web-camera (13) selected by the user to the TV set (2) display device (4).

19 Claims, 7 Drawing Sheets

(51) Int. Cl.
*H04N 21/4223* (2011.01)
*H04N 21/431* (2011.01)
*H04N 21/443* (2011.01)

(56) References Cited

U.S. PATENT DOCUMENTS

| | | |
|---|---|---|
| 10,361,866 B1 * | 7/2019 | McGregor ............ H04L 9/3239 |
| 2003/0214527 A1 | 11/2003 | Paul |
| 2006/0020990 A1 | 1/2006 | McEneaney |
| 2009/0153389 A1 | 6/2009 | Kerr et al. |
| 2012/0131326 A1 * | 5/2012 | Lau ........................ H04L 63/102 |
| | | 713/150 |
| 2017/0171341 A1 | 6/2017 | Zane et al. |
| 2017/0347129 A1 | 11/2017 | Levi et al. |

\* cited by examiner

AUTOMATED DATA MANAGEMENT SYSTEM IN A SMART TELEVISION

The invention relates to the field of radioelectronics and, in particular, it relates to technical equipment for smart television systems, e.g., systems that support the Smart TV technology, and it may be used for automated data management during exchange thereof between system elements.

Market appearance of a large variety of gadgets (smartphones, tablets etc.), which allow user to access any streaming video and other multimedia content in the Internet within the shortest time, has reduced the popularity of usual TV sets significantly. Being in the need of withstanding such competition, the latter have begun modernizing actively.

Thus, modern TV sets impress by advantages in terms of a picture quality. Furthermore, display devices of the modern TV sets (screens or displays) now have almost unlimited diagonal with the thickness being minimized. All of it allows active use of the modern TV sets also as finishing decorative panels, interior elements etc.

Therewith, the inventor has come up with idea to use such TV sets as "live wallpapers" or "windows on the world" embedded in a wall or a ceiling, the TV sets displaying both traditional terrestrial channels and special multimedia content or continuous streaming video from web-cameras, which are arranged at various locations of the globe or even in the cosmic space. Such "windows on the world" may be mounted, e.g., in houses or institutions, wherein there is a need of providing information or entertaining users, such as restaurants, airports, railway stations, supermarkets etc.

When implementing such "windows on the world" the inventor has faced at least two main technical issues.

The first of them lies in how to provide a connection between a TV set that usually operates in a mode of receiving terrestrial channels with a remote web-camera that is capable of continuous transmission of the streaming video to such TV set.

The second issue lies in how to implement the same in an automated mode "power-on-and-forget" without use of excess equipment and with user time and efforts for connecting and setting being minimized.

In order to solve the first issue it is now fully possible to use a data management system that comprises a TV set display device that is connected, e.g., through a HDMI-interface, to any modern personal computer connected to the Internet.

However, such solution requires a plurality of additional actions besides additional equipment (a computer itself and a HDMI-cable). Firstly, it is necessary to establish the HDMI-connection by connecting the HDMI-cable to the corresponding connectors of the TV set and computer. Secondly, each time it is necessary to put the TV set into a mode of receiving data from the computer, to establish the connection between the latter and a remote server in the Internet, then to find a certain resource that associates the computer with a desired web-camera and allows to receive a streaming video therefrom, to set the desired parameters of such video, its playback mode, volume etc. Furthermore, such data management system cannot be considered as being fully automated, since it requires human participation as an active resource and, thus, it does not solve the second mentioned issue.

Such second issue is partially solved by the presently known smart television systems that support the Smart TV technology, the systems comprise a network interface device for enabling a connection with a remote server in the Internet. For example, an automated data management system in a smart television chosen as a closest analogue that is disclosed in the patent document RU 2621899 C2 (SAMSUNG ELECTRONICS CO LTD [KR]), Aug. 6, 2017, comprises at least one TV set equipped with at least one user device, a display device and a control unit that comprises a TV set processor device, a TV set memory unit and television and multimedia signals receiver connected on the system level, wherein the TV set processor device is connected to a server to form a network, the server being configured to exchange data with said TV set processor device, wherein the control unit is configured to put the TV set into a mode of receiving a television and radio broadcasting signal, into a mode of receiving multimedia data from the server, as well as into a standby mode.

However, such system, as well as other ones being similar thereto, does not provide for a direct user access to those particular Internet resources, which transmit the streaming video from the remote web-cameras to the TV set, i.e. it does not solve the first mentioned issue. Usually, Internet access in modern smart television systems consists of a small number of applications and a search engine having limited search capabilities.

Even if certain applications, which transmit the streaming video from remote web-cameras continuously, for providing access to the resources are specifically installed in such systems, it will also require the user time and additional actions after usual powering the TV set in order to receive the streaming video from the desired web-camera on a display device. Having powered the TV set, in order to playback such streaming video, each time the user again will have to switch to a mode of receiving data from the remote server in the Internet, to access a certain resource, to choose a certain web-camera, to set a desired resolution of the streaming video, its playback mode, brightness, contrast, volume etc.

Furthermore, it follows from the above-mentioned that such system is not sufficiently automated and requires participation of a human as an active resource when managing data. In other words, it does not completely solve the second above-mentioned issue, namely, playback of the streaming video from the desired default web-camera immediately after powering the TV set in the "power-on-and-forget" mode.

The invention is based on a task of developing such an automated data management system in a smart television, which, by means of introducing new and improving existing structural elements and connections therebetween, achieves the following technical effect:

reduction of time and efforts for establishing connection between the TV set and the remote web-camera to transmit the streaming video therefrom to a TV set display device, while at the same time providing for reliability of such connection and its implementation in an automated continuous process, while avoiding participation of a human as an active resource.

The stated task is solved by that an automated data management system in a smart television, the system comprising at least one TV set equipped with at least one user device, a display device and a control unit that comprises a TV set processor device, a TV set memory unit and television and multimedia signals receiver connected on the system level, wherein the TV set processor device is connected with a server to form a network, the server being configured to exchange data with said TV set processor device, wherein the control unit is configured to put the TV set into a mode of receiving a television and radio broadcasting signal, into a mode of receiving multimedia data from the server, as well as into a standby mode, according to the invention, comprises a plurality of web-cameras being configured to send a signal with a streaming video to the server in a real time, wherein the server comprises, being connected on the system level, a server processor device, a processing unit of such streaming video and other multimedia data, a server memory unit that stores data about connected web-cameras and data about types of processing the streaming video, which are associated with first identifiers, in a database, and streaming video records from certain web-cameras, which are associated with the first and second identifiers, in a time journal, while the user device comprises an authorizing unit that is configured to automatically generate a first encoded identifier that corresponds to at least one web-camera and to at least one processing type of the streaming video therefrom, and to send such first encoded identifier to the TV set processor device, which is configured to store, in the TV set memory unit, the first encoded identifier that corresponds to at least one web-camera and to at least one processing type of the streaming video therefrom, and, when it is polled by the server, to send such first encoded identifier and a service message that indicates that the TV set is in the standby mode to the server, wherein:

upon receipt of such first encoded identifier the server processor device is configured to decode it, and upon receipt of such service message the server processor device is configured to:

refer to the database of the server memory unit and to select at least one web-camera and at least one of the processing types of the streaming video therefrom, which correspond to the first identifier;

provide a command for performing the selected processing of the streaming video from the at least one selected web-camera to said processing unit, and transmit the processed streaming video from the processing unit to said receiver followed by receipt and playback of such streaming video on the display device, wherein the TV set processor device is configured to receive commands for sending a query to the server database and time journal from the user device, in response thereto, to receive data about a certain at least one web-camera and the processed streaming video that has been displayed therefrom in a certain time period on said display device, and to store such data in the TV set memory unit, the user device authorization unit is configured to automatically generate a second encoded identifier that corresponds to the data about the certain at least one web-camera and the processed streaming video that has been displayed therefrom in a certain time period on said display device, and to send such second encoded identifier to the TV set processor device that is configured to store the second encoded identifier that corresponds to the data about the certain at least one web-camera and the processed streaming video that has been displayed therefrom in the TV set memory unit, and, when it is polled by the server, to send such second encoded identifier and a service message that indicates that the TV set is in the mode of receiving multimedia data to the server, wherein upon receipt of such second encoded identifier the server processor device is configured to decode it, and upon receipt of such service message the server processor device is configured to:

refer to the database and to the time journal of the server memory unit and to select data about the certain at least one web-camera and the processed streaming video that has been displayed therefrom in a certain time period on said display device, which correspond to the second identifier, and transmit the selected processed streaming video to said receiver followed by receipt and playback of such streaming video on the display device.

Therefore, due to introducing the remote web-cameras, which are connected to the TV set through the system structural elements and are configured to transmit the streaming video to the TV set display device, into the system, the first mentioned technical issue, which the inventor has faced with, is solved.

At the same time, due to the above-mentioned certain firmware configuration of the server and TV set processor devices, it is possible to inform the server about the fact that the TV set is in the standby mode and to cause it to transmit the streaming video from the web-cameras to the TV set after this, i.e., for example, once the TV set has been powered on. In other words, it will be sufficient for the user just to power one the TV set in order to watch the streaming video from the at least one selected web-camera upon performing of certain insignificant settings only once. Also, it completely solves the second mentioned technical issue, which the inventor has faced with, and enables the "windows one the world" developed by him to operate in the "power-on-and-forget" mode.

Besides, the defined configuration of the user device enables to request such streaming video by means of unique encoded identifiers that will allow, therewith, a reliability of the process of transmitting the streaming video and protect the system from unauthorized access and/or possible hacker attacks.

The stated task is also solved by the fact that said first identifier corresponds to a certain web-camera and to a certain processing type of the streaming video therefrom.

The stated task is also solved by the fact that said first identifier corresponds to a random web-camera and to a random processing type of the streaming video therefrom.

The stated task is also solved by the fact that said first identifier corresponds to a plurality of certain web-cameras and to a certain processing type of the streaming video therefrom.

The stated task is also solved by the fact that said first identifier corresponds to a plurality of random web-cameras and to a random processing type of the streaming video therefrom.

The stated task is also solved by the fact that the server memory unit stores a library of the multimedia data other than records from said web-cameras, as well as processing types of such multimedia data that are associated with third identifiers, in the database, wherein the user device authorization unit is configured to automatically generate a third encoded identifier that corresponds to at least one piece of said multimedia data and to at least one processing type thereof, and to send such third encoded identifier to the TV set processor device that is configured to store the third encoded identifier that corresponds to at least one piece of said multimedia data and to at least one processing type thereof in the TV set memory unit, and, when it is polled by the server, to send such third encoded identifier and a service message that indicates that the TV set is in the mode of receiving multimedia data thereto, wherein upon receipt of such third encoded identifier the server processor device is configured to decode it, and upon receipt of such service message the server processor device is configured to:

refer to the database of the server memory unit and to select at least one piece of the multimedia data and at least one processing type thereof, which correspond to the third identifier;

provide a command on performing the selected processing of the multimedia data to said processing unit, and transmit the processed at least one piece of the multimedia data from the processing unit to said receiver followed by receipt and playback of the corresponding signal on the display device.

The stated task is also solved by the fact that the TV set processor device, when it is in the mode of polling by the server, is configured to send a service message that indicates that the playback of said at least one piece of the multimedia data is completed, wherein the server processor device, upon receipt of such service message, is configured to refer to the database of the server memory unit and to select at least one web-camera and at least one of the processing types of the streaming video therefrom, which correspond to the first identifier;

provide a command for performing the selected processing of the streaming video from the at least one selected web-camera to said processing unit, and transmit the processed streaming video from the processing unit to said receiver followed by receipt and playback of such streaming video on the display device.

The stated task is also solved by the fact that said third identifier corresponds to the certain piece of the multimedia data and to the certain processing type thereof.

The stated task is also solved by the fact that said third identifier corresponds to a random piece of the multimedia data and to a random processing type thereof.

The stated task is also solved by the fact that said third identifier corresponds to a number of certain pieces of the multimedia data and to the certain processing type thereof.

The stated task is also solved by the fact that said third identifier corresponds to a number of random pieces of the multimedia data and to a random processing type thereof.

The stated task is also solved by the fact that the TV set memory unit stores data about web-cameras connected to the server and data about processing types of the streaming video, which could be performed by the server processing unit, a catalog to said library of the multimedia data and data about processing types of such multimedia data, which could be performed by the server processing unit, while the TV set processor device is configured to update such data, when it is polled by the server.

The stated task is also solved by the fact that the user device comprises a dynamic interface user device with an input-output periphery interactive device that is configured, in response to the user commands, to cause the authorization unit to automatically generate said first, second and third encoded identifiers, as well as to send queries to the TV set processor device for receiving, from the TV set memory unit, said data about web-cameras connected to the server, data about processing types of the streaming video, which could be performed by the server processing unit, a catalog to said library of the multimedia data and data about processing types of such multimedia data, which could be performed by the server processing unit, as well as said data about the certain at least one web-camera and the processed streaming video that has been displayed therefrom within a certain period of time on said display device.

The stated task is also solved by the fact that the user device is equipped with a graphical interface for displaying said data about web-cameras connected to the server, data about processing types of the streaming video, which could be performed by the server processing unit, a catalog to said library of the multimedia data, data about processing types of such multimedia data, which could be performed by the server processing unit, as well as said data about the certain at least one web-camera and the processed streaming video that has been displayed therefrom within a certain period of time on said display device.

The stated task is also solved by the fact that the user device is structurally embedded into the TV set control unit, while the user device graphical interface is configured to be partially or fully displayed on the display device.

The stated task is also solved by the fact that user device is a smartphone, a tablet or a laptop connected to the TV set processor device to form a network, while the user device graphical interface is configured to be partially or fully displayed on a screen of the smartphone, tablet or laptop.

The stated task is also solved by the fact that it comprises one TV set and a plurality of the user devices connected to the TV set processor device to form a network through a TV set network interface device that is configured to provide a restricted access for the authorization units of the user devices.

The stated task is also solved by the fact that it comprises several TV sets connected to the server to form a network through a server network interface device that is configured to provide a restricted access for the processor devices (6) of the TV set.

The stated task is also solved by the fact that the first identifier consists of a certain user name, a number of at least one web-camera, a number of at least one processing type of the streaming video therefrom and an address of the TV set processor device, which are encoded by elements of cryptographic keys when sending to the server.

The stated task is also solved by the fact that the second identifier consists of a certain user name, a number of at least one web-camera, a number of the processed streaming video that has been displayed therefrom within a certain period of time and an address of the TV set processor device, which are encoded by elements of cryptographic keys when sending to the server.

The stated task is also solved by the fact that the third identifier consists of a certain user name, a number of at least one piece of said multimedia data, a number of at least one processing type thereof and an address of the TV set processor device, which are encoded by elements of cryptographic keys when sending to the server.

The invention is explained by the drawings, which depict the following.

Below there is a detailed description of the automated data management system in the smart television and operation thereof.

Figure 1:
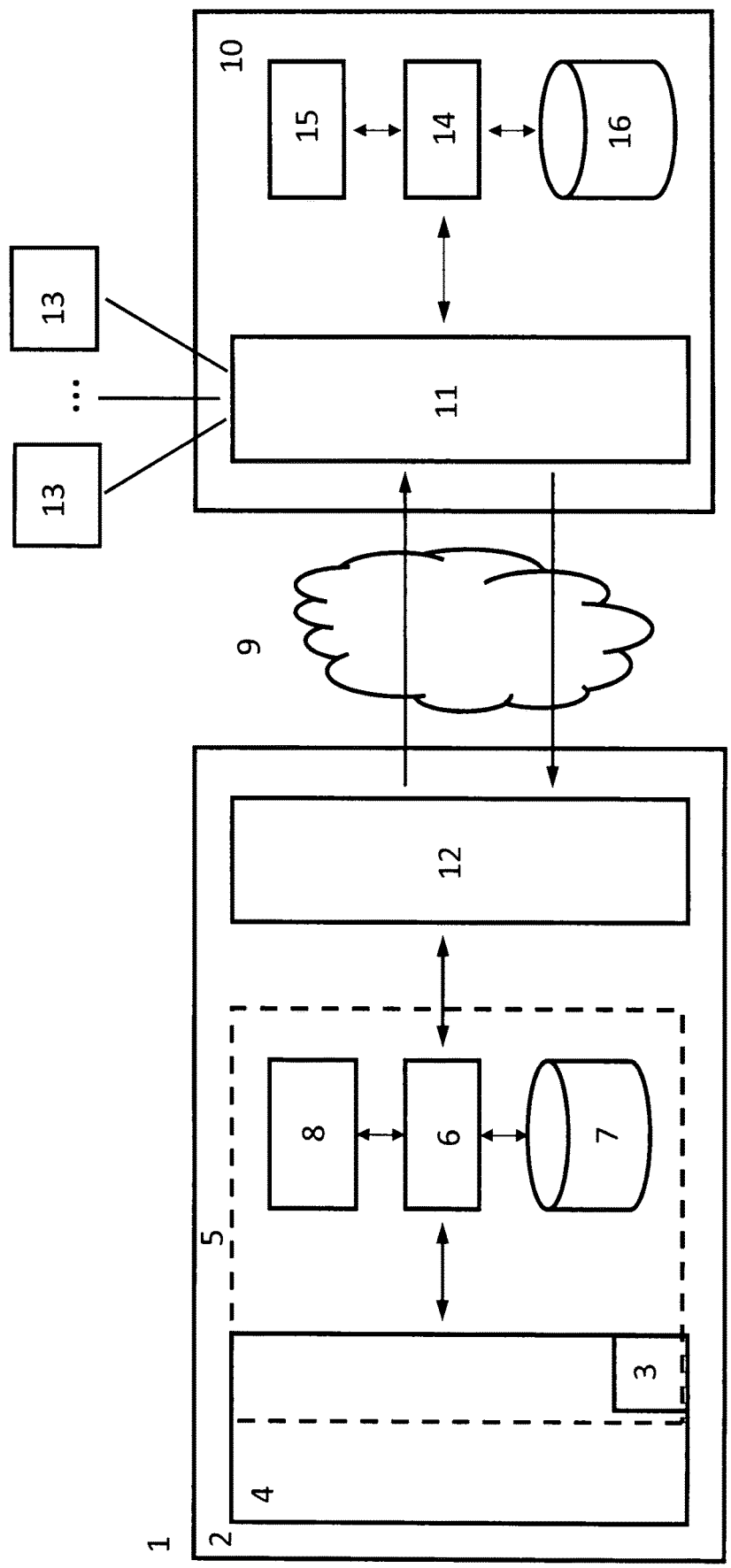
FIG. 1 illustrates an overall diagram of the automated data management system in the smart television, according to the proposed invention.

We hereby refer to FIG. 1, which shows an overall diagram of the suggested automated system that has a commercial name "Vivikna". The automated system 1 comprises a TV set 2 that supports the smart television technology Smart TV and a set of multimedia exchange standards, e.g., DNLA. The TV set 2 is equipped with a user device 3, a display device 4 and a control unit 5.

The display device 4 is a screen of the TV set that may be implemented according to any technology known to a skilled person, e.g., LED, OLED, LCD, TFT LCD (e.g., with TN or IPS matrix).

Figure 2:
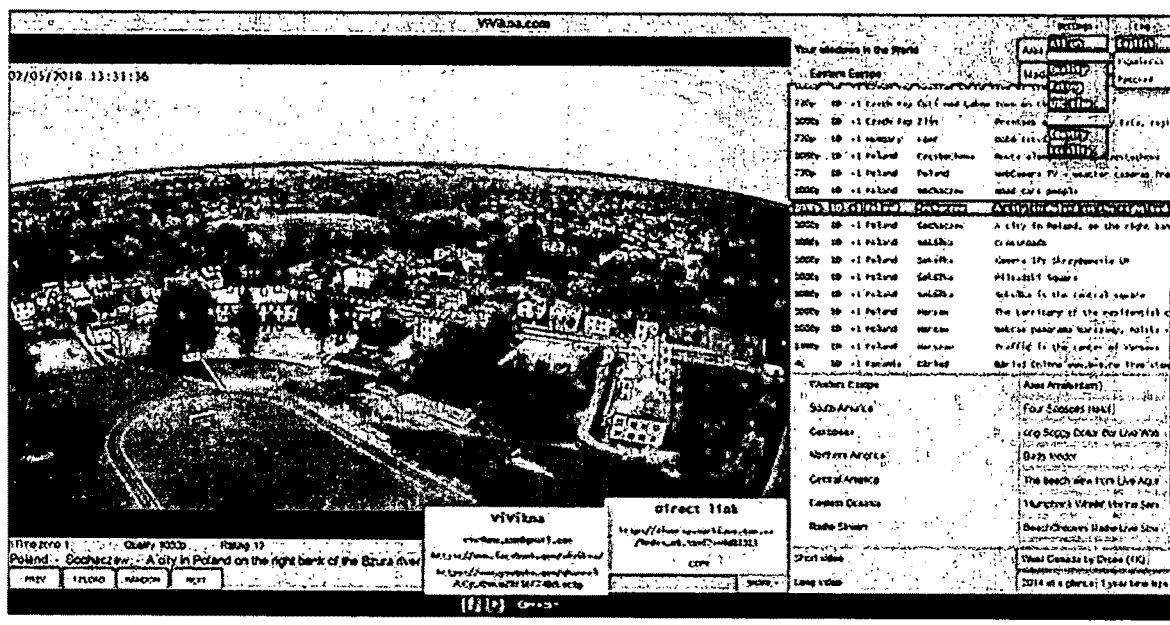
FIG. 2 illustrates a screenshot of the display device with the graphical user interface.

The user device 3 comprises a dynamic interface user device with an input-output periphery interactive device. The user device 3 illustrated in FIG. 1 is structurally embedded into the TV set control unit 5 and has a graphical interface that is configured to be partially or fully displayed on the display device as shown in FIG. 2 that will be described in more detail herein below.

It will be understood by a skilled person that the user device 3 may not be structurally embedded into the control unit 5. The user device may be a smartphone, a tablet or a laptop connected to the TV set processor device to form a network, while the user device graphical interface is configured to be partially or fully displayed on a screen of the smartphone, tablet or laptop.

The control unit 5 comprises a TV set processor device 6, a TV set memory unit 7 and digital television and multimedia signals receiver 8, which are connected on the system level.

The TV set processor device 6 comprises one or more single- or multi-core processors. The TV set memory unit 7 comprises a random access memory RAM and a read-only memory ROM or an electrically erasable programmable read-only Memory EEPROM with a suitable operation system installed, e.g., Apple tvOS, Android or Linux, and a suitable media server client application.

The TV set processor device 6 is connected to the server 10 to form a network 9, the server exchanging data with said TV set processor device through a server network interface device 11 and a TV set network interface device 12.

In a preferred embodiment, a network 9 pipe may be the Internet, or it is fully possible to use LAN, WAN or any other suitable pipe within the frames of the present invention. The network 9 may be wired or wireless. The server 10 and the TV set processor device 6 are connected in such a manner that their network interface devices 11 and 12 exchange data in a "question-response" mode according to any known and suitable secure communication protocol, e.g., IP protocol with the DLNA standards. The connection between the server 10 and the TV set control unit 5 is made according to the "client-server" architecture, wherein the TV set control unit 5 is connected to the network as the "client", while said server 10 is connected as the "server". It is preferable to establish such connection as "media client—media server".

Surely, according to such principle, several TV sets 2 connected to the server 10 to form the network 9 through the server network interface device 11 that is configured to provide a restricted access for the processor devices 6 of the TV set, may be used. Therewith, it will be understood by a skilled person that one TV set 2 may have a plurality of the user devices 3 connected to the TV set processor device 6 to form a network suitable therefor through the TV set network interface device 12 that is configured to provide a restricted access for the authorization units of the user devices 3.

A plurality of the web-cameras 13, which send a signal with the streaming video to the server in real time, are connected to the server network interface device 11. Traditional web-cameras connected to computers, which are connected to the server 10 to form the network, may be used as the web-cameras 13. Network or IP web-cameras, which have their own web-server and IP-address, may be used as the web-cameras 13. It will be understood by a skilled person that any cameras suitable for implementation of the present invention may be used.

The scope of the present invention is not limited by location, specifics and directivity of such cameras in any way.

They may be stationary or movable. They may be located at various locations of the globe, at opened areas or indoors, underground;

located inflight using piloted or pilotless aircrafts, such as drones or quadcopters;

in aqueous space, e.g., on ships or artificial islands, in cosmic space on a suitable equipment such as satellites, cosmic stations etc.

It is desirable for the cameras to be made according to the standards of the high resolution matrix within the frames of the present invention. It is preferable to use the resolution of not less than 1280×960 pixels, according to the standards Full HD, 4K UHD, 8K UHD or other standards suitable therefor.

The server 10 comprises a server processor device 14, a processing unit 15 for the streaming video from the web-cameras and for processing of other multimedia data, a server memory unit 16, which are connected at the system. The server 10 may be configured as any suitable media server that supports the same media-data exchange standards as the TV set 2, e.g., DNLA. The server processor device 14 may have one or more single- or multi-core processors, wherein it is desirable to use processors of the Intel Xeon 5 family or analogues. The server memory unit 16 comprises a random access memory RAM and a read-only memory ROM or an electrically erasable programmable read-only Memory EEPROM with a suitable operation system installed, e.g., Android or Linux. The processing unit 15 for the streaming video from the web-cameras and for processing of other multimedia data comprises a transcoder device that may perform playback an initial video from the digital videostream, insertion of any static graphical data, e.g., logos or subtitles, into its frames or applying filters thereto, such as color, black-and-white filters, to perform a procedure of time delay/acceleration of displaying the frames, including the time-lapse procedure, to regulate the audio track volume, to perform a scenary processing of the streaming video etc.

The server memory unit 16 stores data about connected web-cameras 13 and data about the above-listed processing types of the streaming video, which could be performed by the processing unit 15, in the database. Records of such database comprise a unique number NUMBER1 of each web-camera 13 and geographical data of the camera location associated thereto, such as pertaining to an earth UNO sub-region, continent, time zone, country, country region, city etc., technical data of the web-camera itself, such as signal quality, camera resolution, current time in the location thereof, as well as current rating data received from users of the web-camera.

The records of such database also comprise a unique number NUMBER2 of each processing type that could be performed by the processing unit 15 and a certain processing type associated thereto: insertion of any static graphical data, e.g., logos or subtitles, applying filters to the streaming video such as color or black-and-white filters, time delay/acceleration of displaying the frames, including the time-lapse procedure, regulation of the audio track volume, scenary processing etc.

The server memory unit 16 stores records from the web-cameras, which streaming video may be transmitted to the authorized users NAME to the authorized TV sets MAC. The server memory unit 16 is also equipped with a time journal that interacts with the database, the journal comprising records regarding the web-cameras and processing type of the streaming video therefrom, which are associated with a time scale, which have been transmitted to the certain authorized users NAME to the authorized TV sets MAC. Such records in the time journal may have the following structure [NAME, NUMBER1, NUMBER2, MAC, TIME]. Therewith, the server 10 may be equipped with any network time synchronizer known to a skilled person.

The server memory unit 16 stores a library of the multimedia data other than the records from said web-cameras, as well as processing types of such multimedia data, in the database. The records of such database comprise a unique number NUMBER3 of each piece of such data and data associated therewith such as data type—video, static pictures, audio etc., genre—feature film, show, music, advertisement etc., duration, filming time, copyright, as well as current rating data received from users of such pieces of the multimedia data.

Such records are also associated with the above-mentioned records of the database, which also comprise the unique number NUMBER2 of each processing type that could be performed by the processing unit 15 and the certain said processing type associated thereto.

Said time journal also comprises records regarding the pieces of the multimedia data and processing type thereof, which are associated with the time scale, which have been transmitted to the certain authorized users NAME to the authorized TV sets MAC. Such records in the time journal may have the following structure [NAME, NUMBER3, NUMBER2, MAC, TIME]. The server 10 may be equipped with any network time synchronizer known to a skilled person.

A database management system (DBMS) is configured to perform selection and sorting of the data therein or in the time journal according to any of the listed fields, or to involve a random number generator that allows to select a random record, according to certain commands.

The TV set memory unit 7, in turn, also stores data about web-cameras 13 connected to the server and data about processing types of the streaming video, which could be performed by the server processing unit 15, a catalog to said library of the multimedia data and data about processing types of such multimedia data, which could be performed by the server processing unit 15. The TV set processor device is configured to update such data when it is polled by the server.

Therewith, the graphical user interface 3, as shown in FIG. 2, is capable of displaying said data about web-cameras 13 connected to the server 10, data about processing types of the streaming video, which could be performed by the processing unit 15, a catalog to said library of the multimedia data, data about processing types of such multimedia data, which could be performed by the server processing unit, as well as said data about the certain at least one web-camera and the processed streaming video that has been displayed therefrom within a certain period of time on the display device 4, which are stored in the TV set memory unit.

The dynamic interface device with the input-output periphery interactive device provided in the user device 3 may be designed in any way known to a skilled person. It may represent a push-button control panel, a control touch pad or a touch screen with a virtual keyboard for inputting commands to the TV set 2.

The user device 3 comprises an authorization unit that is designed on the base of at least one coder that may be comprised in the TV set control unit 5 or may be directly embedded into the user device. The authorization unit is configured, in response to the user commands received from the dynamic interface device, to automatically generate requests, including an authorization request, for performing certain machine-readable instructions to the TV set processor device 6.

Figure 7:
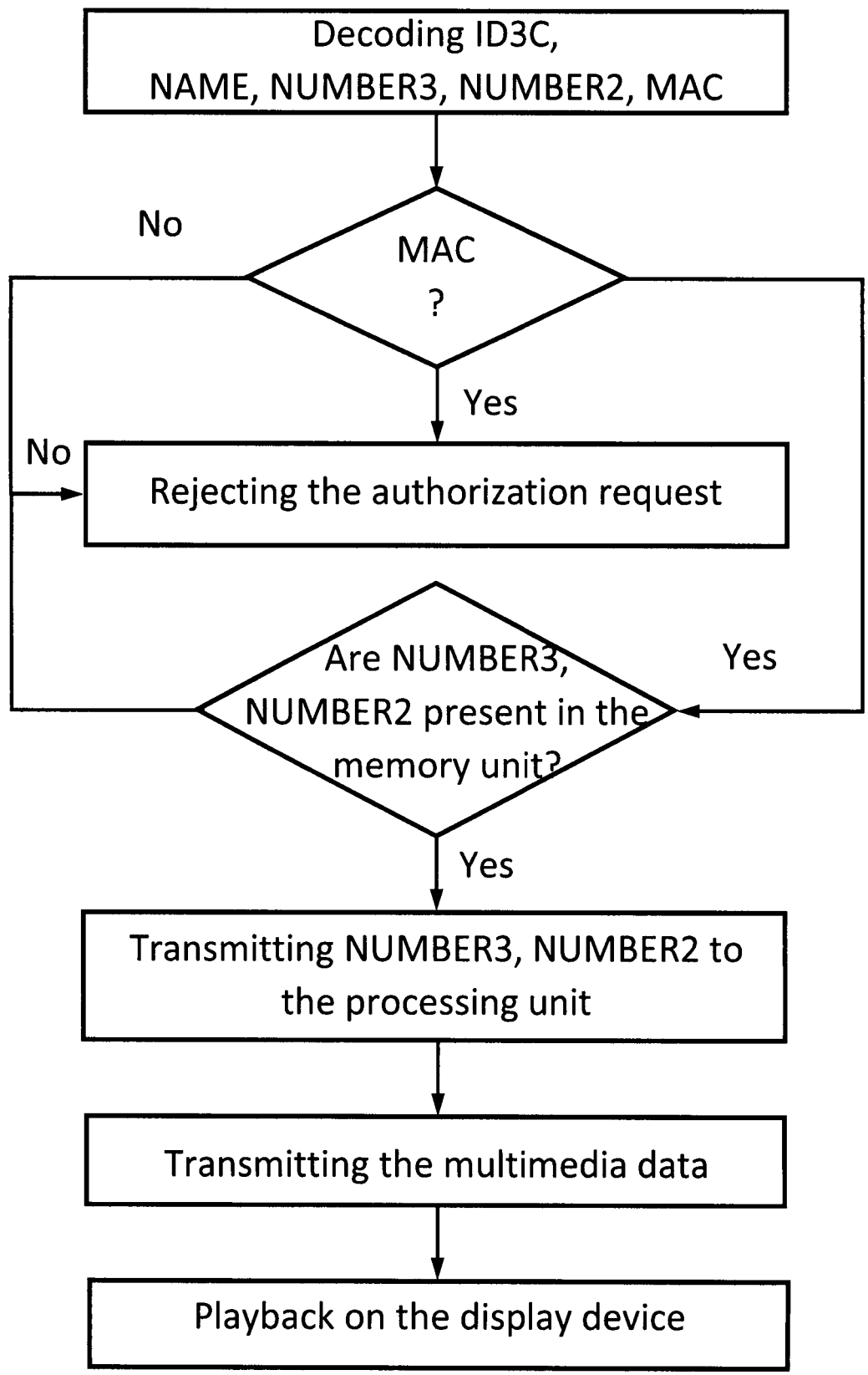

Such commands may be usual commands for the TV set 2 control unit 5—putting it from the standby mode, which is performed once the TV set has been connected to the network by default, to another mode, e.g., into the mode of receiving the multimedia data from the server or to the traditional mode of receiving a television and radio broadcasting signal, as well as switching/rewinding the multimedia data or terrestial channels, regulating standard TV set 2 parameters—brightness, volume etc., or activation of the graphical interface on the screen as shown in FIG. 7.

Upon calling the graphical interface the user may select at least one web-camera 13 of interest and the processing type of the streaming video therefrom that may be performed by the processing unit 15 from the graphical interface collection menu. Also, the user has to input a command for playback of the streaming video from such web-camera 13 each time when the TV set is in the standby mode, e.g., each time after powering the TV set on. The user may select several web-cameras 13 with the streaming video therefrom that may be playbacked, e.g., with a certain time interval, and/or several processing types of the streaming video from one or more web-cameras 13. Also, the user may select a random web-camera 13 and/or a random processing type of the streaming video in the interface menu.

Figure 3:
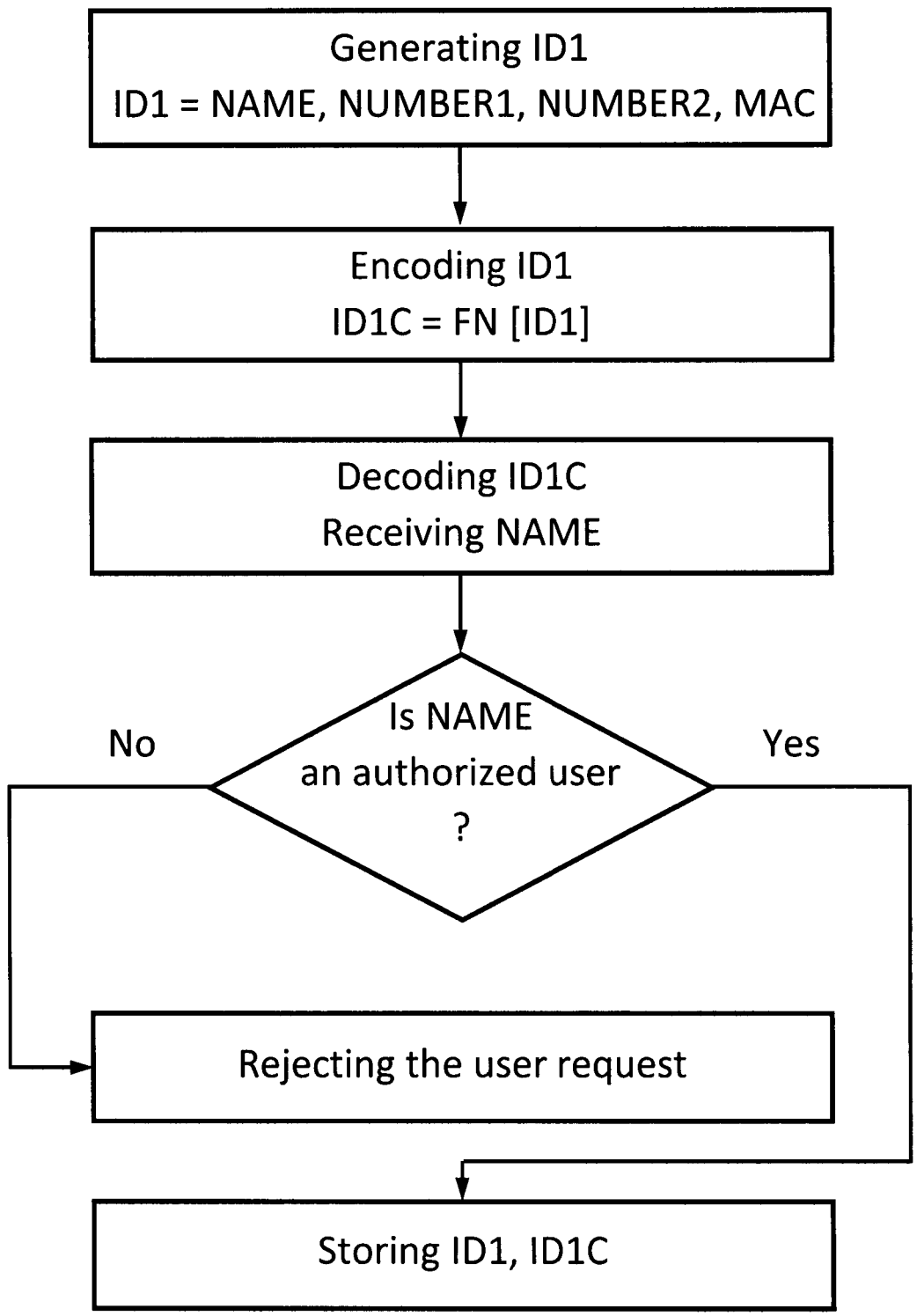
FIG. 3 illustrates a flowchart of creating and storing the first identifier.

Upon input of such commands to the dynamic interface device, the user authorization unit 3, as shown in FIG. 3, is configured to automatically generate the first identifier ID1 immediately that corresponds to the at least one web-camera 13 and to the at least one processing type of the streaming video therefrom. Such first identifier ID1 is a request to the TV set processor device 6 to execute certain machine-readable instructions by it and by the server processor device 14, and at the same time it may serve as a request for user authorization and consequently as a request for the TV set 2 authorization in the automated system 1 according to the present invention.

Upon input of said commands, the user participation in the automated system 1 in fact is finished. Then, in order to playback the streaming video from the at least one selected web-camera 13 on the display device 4 the user will only have to power the TV set on.

After the user selects one certain web-camera 13 and certain processing type of the streaming video therefrom, the first identifier ID1 may have the conditional format ID1=NAME, NUMBER1, NUMBER2, MAC, where NAME is a value of the user name in the automated system 1, NUMBER1 is a unique number of the web-camera 13, NUMBER2 is a unique number of the processing type of the streaming video, MAC is an address of the TV set processor device 6.

After the user selects the one random web-camera 13 and the random processing type of the streaming video therefrom, the first identifier ID1 may have the conditional format ID1=NAME, RANDOM [NUMBER1, NUMBER2], MAC.

After the user selects N web-cameras 13 and N processing types of the streaming video therefrom, wherein the streaming video from the web-cameras may be playbacked during a certain time duration TIME, the first identifier ID1 may have the conditional format ID1=NAME, [TIME1 [NUMBER1, NUMBER2], . . . TIME N [NUMBER1, NUMBER2]], MAC.

A skilled person will be aware of other formats derived by means of combining a number of various web-cameras 13 and various processing types thereof.

The above-mentioned encoder of the authorization unit is configured to immediately encode the generated sequence of the first identifier ID1 by elements of cryptographic keys that may be performed by a encryption method known to a skilled person, e.g., according to the known Diffie-Hellman algorithm, thereby obtaining the first encoded identifier ID1C=FN[ID1], and to send such first encoded identifier ID1C to the TV set processor device 6. The latter is configured to decode the ID1C, to compare the obtained value of the NAME with the values of the names of the authorized users, which are stored in the TV set memory unit 7. If the value of the NAME corresponds to the authorized user, the TV set processor device 6 stores the first encoded identifier ID1C, ID1 in the corresponding cells of the TV set memory unit 7 and waits for further instructions. If the value of the NAME is not found in the list of the authorized users, the TV set processor device 6 sends a service message about refusal of the authorization request to the user device 3.

Figure 4:
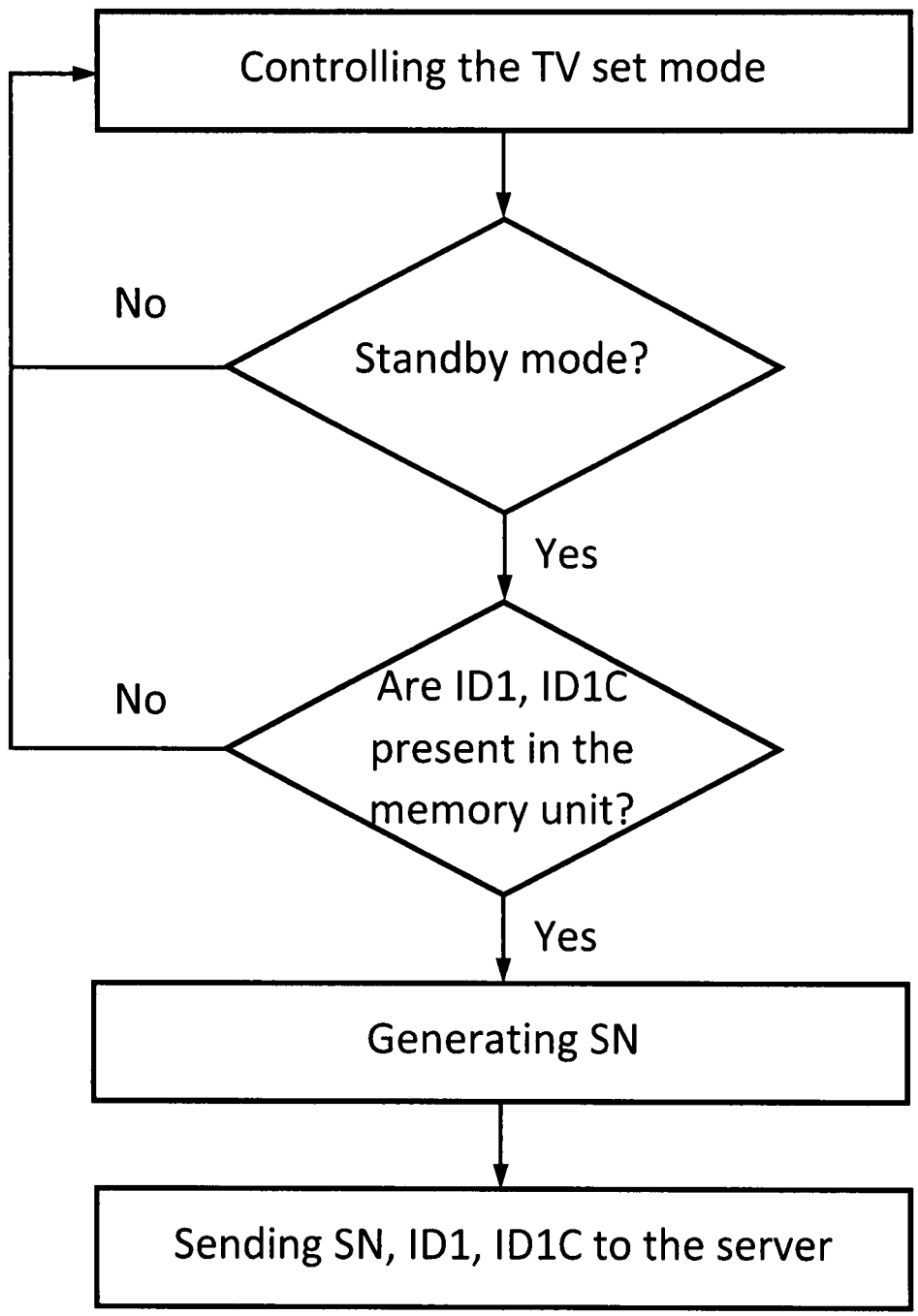
FIG. 4 and FIG. 5 show a flowchart of transmitting the streaming video from the web-cameras to the TV set display device in the automated system according to the proposed invention.

As shown in FIG. 4, the control unit 5 performs constant control of the TV set 2 operation modes with the involvement of the TV set processor device 6. The TV set processor device 6 operates in the mode of the constant polling it by the server 10. The TV set processor device 6 is configured, upon putting the TV set into the standby mode, to refer to the TV set memory unit 7 and, if the first encoded identifier ID1C is stored therein, to send such first encoded identifier ID1C and a service message SN that indicates that the TV set 2 is in the standby mode, to the server 14. Such service message SN may be formed as a PULL-message (Pull Service Notification), according to the standards of the IP-protocol.

Figure 5:
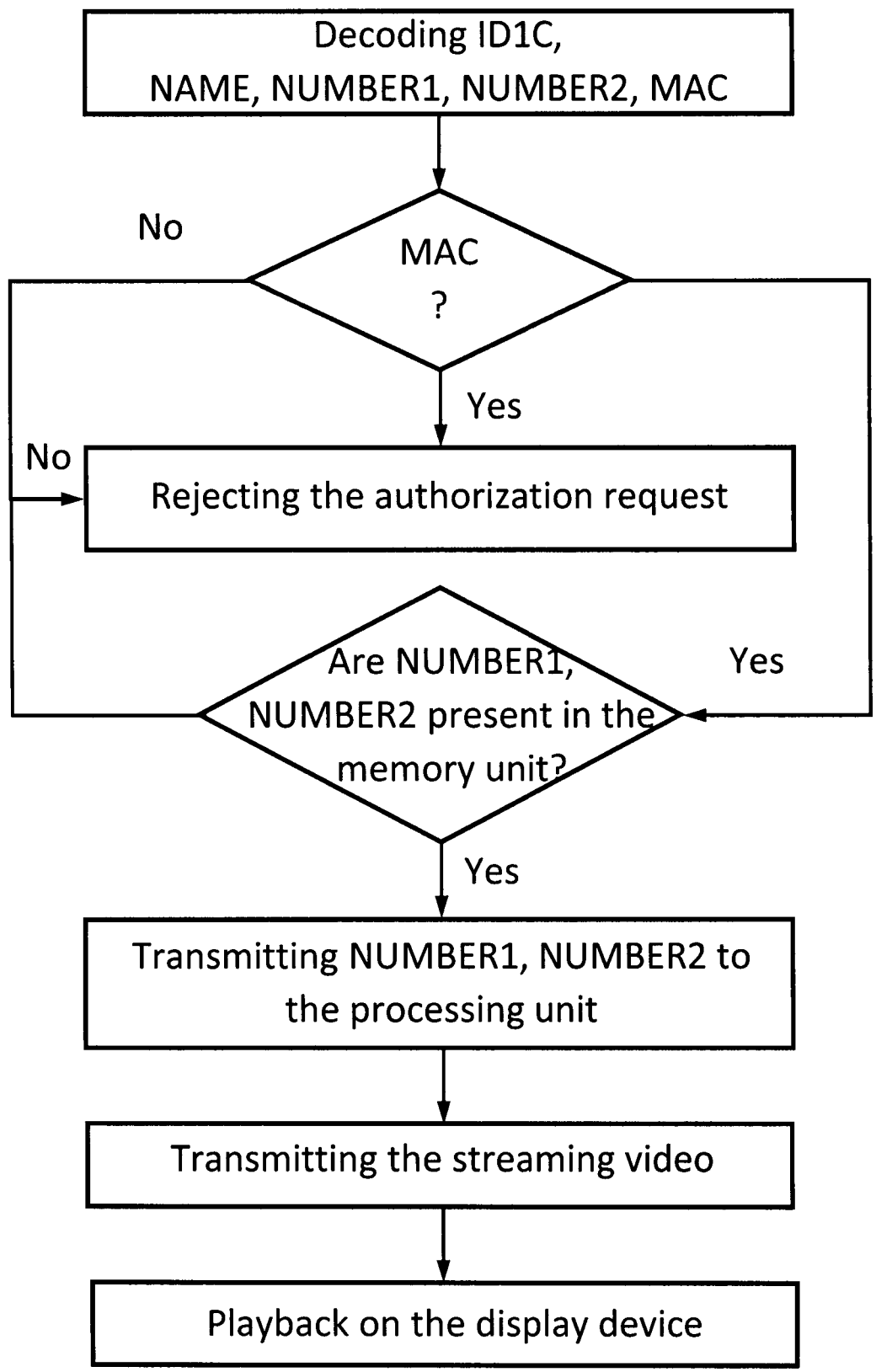

We hereby further refer to FIG. 5. Upon receipt of such first encoded identifier ID1C, the server processor device 14 is capable of decoding it by decryption of the elements of its cryptographic keys, and, upon receipt of such service message SN, to execute a number of instructions according to the ID1C. According to such instructions, the server processor device 14 is capable of referring to the server memory unit 16 and comparing the received MAC value with the values of the MAC-addresses of the TV sets authorized in the system 1, which are stored in the server memory unit 16. If the MAC value does not correspond to the MAC-address of the authorized TV set, the server processor device 14 sends a service message about refusal of the authorization request to the TV set processor device 6.

According to said instructions, the server processor device 14 is capable of referring to the DBMS of the server memory unit 16 and causing it to perform a search according to the received values of the NUMBER1, NUMBER2. If such values are not found in the database of the server memory unit 16, the server processor device 14 sends a service message about refusal of the authorization request to the TV set processor device 6. If the values of the NUMBER1, NUMBER2 are found, the server processor device 14 provides a command to the processing unit 15 to perform the selected processing of the streaming video NUMBER2 from the at least one selected web-camera NUMBER1. Then, the server processor device 14 transmits the processed streaming video from the processing unit 15 through the network interface devices 11, 12 to the receiver 8 followed by receipt and playback of such streaming video on the display device 4 that takes place for the user once the TV set 2 has been powered on.

If, for some reasons, the user wishes to watch the displayed streaming video, he/she provides the corresponding commands by means of the dynamic interface device, which cause the control unit 5 to put the TV set into the mode of receiving the multimedia data. Whereby, the TV set processor device 6 sends a query to the server 10 database and time journal, in response thereto it receives the data about the certain at least one web—camera 13 and the processed streaming video that has been displayed therefrom in the certain time period on said display device 4, and to store such data in the TV set memory unit 7. Then, this data are displayed on the graphical interface. By means of the dynamic interface device, the user may provide the corresponding commands, which cause the user device 3 authorization unit to automatically generate the second identifier ID2 that corresponds to the data about the certain at least one web-camera 13 and the processed streaming video that has been displayed therefrom in the certain period of time on said display device 4. The second identifier ID2 may have the conditional format ID2=NAME, NUMBER1, NUMBER2, MAC, TIME, where the NAME is a value of the user name in the automated system 1, NUMBER1 is a unique number of the web-camera 13, NUMBER2 is a unique number of the processing type of the streaming video, MAC is a MAC-address of the TV set processor device 6, TIME is a time of playback of the streaming video.

The encoder of the user device authorization unit is configured to immediately encode the generated sequence of the second identifier ID2 by elements of cryptographic keys that may be performed by a encryption method known to a skilled person, e.g., according to the known Diffie-Hellman algorithm, thereby obtaining the second encoded identifier ID2C=FN[ID2], and to send such second encoded identifier ID2C to the TV set processor device 6. The latter is capable of decoding the ID2C, to compare the obtained value of the NAME with the values of the names of the authorized users, which are stored in the TV set memory unit 7. If the value of the NAME is not found in the list of the authorized users, the TV set processor device 6 sends a service message about refusal of the authorization request to the user device 3. If the value of the NAME corresponds to the authorized user, the TV set processor device 6 stores the encoded identifier ID2C, ID2 in the corresponding cells of the TV set memory unit 7 and waits for further instructions.

The TV set processor device 6, when it is polled by the server 10, in this case is capable of sending such second encoded identifier ID2C and a service message SN that indicates that the TV set 2 is in the mode of receiving the multimedia data thereto.

Upon receipt of such second encoded identifier ID2C, the server processor device 14 is configured to decode it, to decrypt the elements of its cryptographic keys, and, upon receipt of such service message SN, to execute a number of instructions according to the ID2C.

According to said instructions, the server processor device 14 is capable of referring to the DBMS of the server memory unit 16 and causing it to perform a search in the time journal according to the received values of the NUMBER1, NUMBER2, TIME. If such values are not found, the server processor device 14 sends a service message about refusal of the request to the TV set processor device 6. If the values of the NUMBER1, NUMBER2, TIME are found, the server processor device 14 provides a command to transmit the processed streaming video through the network interface devices 11, 12 to the receiver 8 followed by receipt and playback of such streaming video on the display device 4.

If the user wishes to watch the multimedia data other than said records from the web-cameras 13, he/she provides the corresponding commands by means of the dynamic interface device, which cause the control unit 5 to put the TV set into the mode of receiving the multimedia data. Upon calling the graphical interface, the user may select at least one piece of the multimedia data of interest and the processing type of such piece that could be performed by the processing unit 15 from the graphical interface collection menu of the multimedia data catalog, e.g., by using a preview function provided in the graphical interface.

The user may select several pieces of the multimedia data, which could be playbacked, e.g., with a certain time interval, and/or several processing types of one or more pieces of the multimedia data. Also, the user may select a random selection of the piece and/or a random processing type thereof in the interface menu.

Upon input of such commands to the dynamic interface device, the user device 3 authorization unit is configured to automatically generate the third identifier ID3 immediately that corresponds to the at least one piece of the multimedia data and to the at least one processing type. Such third identifier ID3 is a request to the TV set processor device 6 to execute certain machine-readable instructions by it and by the server processor device 14, and at the same time it may serve as a request for user authorization and consequently as a request for the TV set authorization in the automated system 1 according to the present invention.

After the user selects one certain piece of the multimedia data and certain processing type, the third identifier ID3 may have the conditional format ID3=NAME, NUMBER3, NUMBER2, MAC, where NAME is a value of the user name in the automated system 1, NUMBER3 is a unique number of the piece of the multimedia data, NUMBER2 is a unique number of the processing type of the streaming video, MAC is a MAC-address of the TV set processor device 6.

After the user selects the random piece of the multimedia data and the random processing type, the third identifier ID3 may have the conditional format ID3=NAME, RANDOM [NUMBER3, NUMBER2], MAC.

After the user selects N pieces of the multimedia data and N processing types, wherein the certain piece may be playbacked during a certain time duration TIME, the third identifier ID3 may have the conditional format ID3=NAME, [TIME1 [NUMBER3, NUMBER2], . . . TIME N [NUMBER3, NUMBER2]], MAC.

A skilled person will be aware of other formats derived by means of combining a number of various pieces and various processing types thereof.

The above-mentioned encoder of the authorization unit is configured to immediately encode the generated sequence of the third identifier ID3 by elements of cryptographic keys that may be performed by a encryption method known to a skilled person, e.g., according to the known Diffie-Hellman algorithm, thereby obtaining the third encoded identifier ID3C=FN[ID3], and to send such third encoded identifier ID3C to the TV set processor device 6. The latter is capable of decoding the ID3C, to compare the obtained value of the NAME with the values of the names of the authorized users, which are stored in the TV set memory unit 7. If the value of the NAME is not found in the list of the authorized users, the TV set processor device 6 sends a service message about refusal of the authorization request to the user device 3. If the value of the NAME corresponds to the authorized user, the TV set processor device 6 stores the third encoded identifier ID3C, ID3 in the corresponding cells of the TV set memory unit 7.

Figure 6:
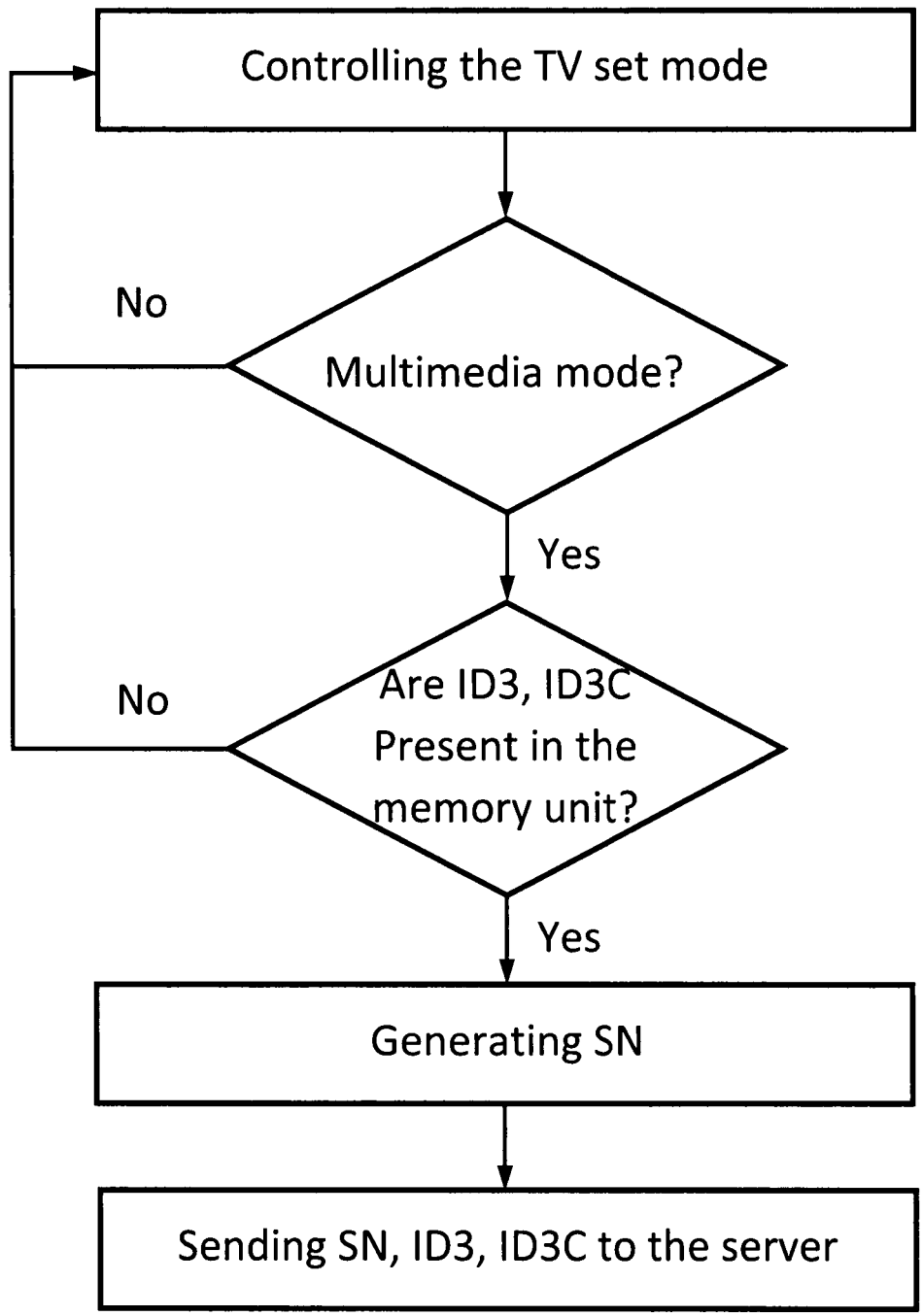
FIG. 6 and FIG. 7 show a flowchart of transmitting the multimedia data to the TV set display device in the automated system according to the proposed invention.

As seen in FIG. 6, the TV set processor device 6 is configured, upon putting the TV set into the mode of receiving the multimedia data, to refer to the TV set memory unit 7 and, if the third encoded identifier ID3C is stored therein, to send such third encoded identifier ID3C and a service message SN generated therewith that indicates that the TV set 2 is in the mode of receiving the multimedia data, to the server 14. Such service message SN may be formed as a PULL-message (Pull Service Notification), according to the standards of the IP-protocol.

Now we hereby refer to FIG. 7, which shows that upon receipt of such third encoded identifier ID3C, the server processor device 14 is capable of decoding it by decryption of the elements of its cryptographic keys, and, upon receipt of such service message SN, to execute a number of instructions according to the ID3C. According to such instructions, the server processor device 14 is capable of referring to the server memory unit 16 and comparing the received MAC value with the values of the addresses of the TV sets authorized in the system 1, which are stored in the server memory unit 16. If the MAC value does not correspond to the MAC-address of the authorized TV set, the server processor device 14 sends a service message about refusal of the authorization request to the TV set processor device 6.

According to said instructions, the server processor device 14 is capable of referring to the DBMS of the server memory unit 16 and causing it to perform a search according to the received values of the NUMBER3, NUMBER2. If such values are not found in the database of the server memory unit 16, the server processor device 14 sends a service message about refusal of the authorization request to the TV set processor device 6. If the values of the NUMBER3, NUMBER2 are found, the server processor device 14 is capable of providing a command to the processing unit 15 to perform the selected processing of the NUMBER2 from the at least one selected piece of the multimedia data NUMBER3. Then, the server processor device 14 sends the processed at least one piece of the multimedia data from the processing unit 15 through the network interface devices 11, 12 to the receiver 8 followed by receipt and playback of the multimedia data on the display device 4.

Therewith, if the user wishes the streaming video from the web-camera 13 selected by him/her with the selected processing type to be playbacked immediately after playback of the multimedia data, he/she, by means of the dynamic interface device, provides the corresponding commands, which cause the control unit 5 to put the TV set into the mode of receiving the multimedia data, and a command to put the TV set into the standby mode immediately after the playback of the at least one multimedia piece is completed. Therewith, it is meant that the first and the third encoded identifiers ID1C and ID3C have been already generated and stored in the TV set memory unit in the above-mentioned way. In this case, immediately after said at least one multimedia piece is playbacked, the TV set processor device 6, in the mode of polling it by the server, sends the service message SN, which indicates that the playback of said at least one piece of the multimedia data is completed and that the TV set 2 is in the standby mode, to the server 10. Upon receipt of such service message SN, the server processor device 14 refers to the database of the server memory unit 16 and selects the at least one web-camera 13 and the at least one of the processing types of the streaming video therefrom, which correspond to the first identifier ID1 of the user; provides a command to said processing unit 15 for executing the selected processing of the streaming video from the at least one selected web-camera 13 and transmits the processed streaming video from the processing unit 15 to said receiver 8 followed by receipt and playback of such streaming video on the display device 4.

The invention claimed is:

1. A system for automated data management in a smart television, the system comprising:
  a TV set equipped with a user device;
  a display device;
  a control unit that comprises:
    a TV set processor device; and
    a TV set memory unit;
  a multimedia signals receiver connected to a server on a system level;
  wherein the TV set processor device is connected to the server to form a network, the server configured to exchange data with said TV set processor device;
  wherein the control unit is configured to put the TV set into a mode of receiving a television and radio broadcasting signal, into a mode of receiving multimedia data from the server, as well as into a standby mode;
  a plurality of web-cameras, the plurality of web-cameras configured to send a signal with a streaming video to the server in a real time after the server is connected on a system level;
  a server processor device;
  a processing unit of such streaming video and of other multimedia data;
  a server memory unit configured to store data about each web-camera in the plurality of web-cameras connected to the server and data about a processing type of the streaming video;
  wherein the data about each web-camera connected to the server and the data about processing type of each streaming video are each associated with a first identifier in a database of the server memory unit;
  the server memory unit further configured to store streaming video records from web-cameras in the plurality of web-cameras that are each associated with the first identifier and a second identifier in a time journal;
  the user device comprises a user device authorization unit configured to:
    automatically generate a first encoded identifier that corresponds to at least one web-camera in the plurality of web-cameras and to a processing type of the streaming video therefrom; and
    to send such first encoded identifier to the TV set processor device, which is configured to store, in the TV set memory unit, the first encoded identifier that corresponds to the at least one web-camera in the plurality of web-cameras and to the processing type of the streaming video therefrom;
  wherein the TV set processor device is configured to send the first encoded identifier and a service message that indicates that the TV set is in the standby mode to the server in response to a poll by the server of the TV set processor device;
  wherein the server processor device is configured to:
    decode the first encoded identifier upon receipt of the first encoded identifier; and
    respond to receipt of the service message to:
      refer to the database of the server memory unit to:
        select at least one web-camera in the plurality of web-cameras; and
        select at least one processing type of the streaming video therefrom, which corresponds to the first identifier; and
      provide a command for performing processing of the streaming video selected from the at least one web-camera and send the streaming video to the processing unit, and thereafter transmit a processed streaming video from the processing unit to the multimedia signals receiver followed by receipt and playback of the processed streaming video on the display device;
  wherein the TV set processor device is configured to receive commands for sending a query to the database of the server memory unit and the time journal from the user device, in response thereto, to receive data about at least one web-camera in the plurality of web-cameras and the processed streaming video that has been displayed therefrom in a time period on said display device, and to store such data in the TV set memory unit;
  the user device authorization unit is configured to automatically generate a second encoded identifier that corresponds to the data about the at least one web-camera and the processed streaming video that has been displayed therefrom in a time period on said display device, and to send such second encoded identifier to the TV set processor device that is configured to store the second encoded identifier that corresponds to the data about the at least one web-camera and the processed streaming video that has been displayed therefrom in the TV set memory unit, and, when it is polled by the server, to send such second encoded identifier and a service message that indicates that the TV set is in the mode of receiving multimedia data to the server; and
  wherein the server processor device is further configured to: decode the second encoded identifier upon receipt of such second encoded identifier; refer to the database of the server memory unit and to the time journal of the server memory unit and to select data about the at least one web-camera and the processed streaming video that has been displayed therefrom in a time period on said display device, which correspond to the second identifier, and transmit the processed streaming video to said multimedia signals receiver followed by receipt and playback of such processed streaming video on the display device.

2. The system according to claim 1, characterized in that said first identifier corresponds to a web-camera and to a processing type of the processed streaming video therefrom.

3. The system according to claim 1, characterized in that said first identifier corresponds to a randomly selected web-camera in the plurality of web-cameras and to a processing type of the processed streaming video therefrom.

4. The system according to claim 1, characterized in that said first identifier corresponds to a plurality of web-cameras and to a processing type of the processed streaming video therefrom.

5. The system according to claim 1, characterized in that said first identifier corresponds to a plurality of random web-cameras in the plurality of web-cameras and to a random processing type of the processed streaming video therefrom.

6. The system according to claim 1, characterized in that the server memory unit stores a library comprising multimedia data, the multimedia data excludes records from said plurality of web-cameras, as well as processing types of such multimedia data that are associated with any third identifier in the database of the server memory unit, and wherein the user device authorization unit is configured to automatically generate a third encoded identifier that corresponds to at least one piece of said multimedia data and to at least one processing type thereof, and to send such third encoded identifier to the TV set processor device that is configured to store the third encoded identifier that corresponds to at least one piece of said multimedia data and to at least one processing type thereof in the TV set memory unit, and, when the user device authorization unit is polled by the server, to send such third encoded identifier and a service message that indicates that the TV set is in the mode of receiving multimedia data thereto, wherein the server processor device is configured to decode the third encoded identifier upon receipt of such third encoded identifier, and the server processor device is further configured to implement the following after receipt of such service message:

refer to the database of the server memory unit and select at least one piece of the multimedia data and at least one processing type thereof, which correspond to the third identifier;

provide a command on performing processing of the at least one piece of the multimedia data and send the at least one piece of the multimedia data to the processing unit, and transmit the at least one piece of the multimedia data after said processing from the processing unit to the multimedia signals receiver followed by receipt and playback of the at least one piece of the multimedia data on the display device.

7. The system according to claim 6, characterized in that the TV set processor device, when it is in the mode of polling by the server, is configured to send a service message that indicates completion of playback of the at least one piece of the multimedia data, wherein the server processor device, upon receipt of such service message, is configured to:

refer to the database of the server memory unit to the at least one web-camera in the plurality of web-cameras and the at least one processing type of the processed streaming video therefrom, which correspond to the first identifier;

provide a command for sending the processed streaming video from the at least one web-camera to the processing unit, and transmit the processed streaming video from the processing unit to the multimedia signals receiver followed by receipt and playback of the processed streaming video on the display device.

8. The system according to claim 6, characterized in that the third identifier corresponds to a piece of the multimedia data and to the at least one processing type thereof.

9. The system according to claim 6, characterized in that the third identifier corresponds to a plurality of pieces of the multimedia data and to the at least one processing type thereof.

10. The system according to claim 6, characterized in that the TV set memory unit is configured to store data about the plurality of web-cameras connected to the server and to store data about processing types of the streaming video, which could be performed by the processing unit, to store a catalog to said library of the multimedia data and data about processing types of the multimedia data, which could be performed by the processing unit, while the TV set processor device is configured to update the catalog, the multimedia data and the data about processing types of such multimedia data, when the TV set processor device is polled by the server.

11. The system according to claim 6, characterized in that the user device comprises a dynamic interface user device with an input-output periphery interactive device that is configured, in response to one or more user commands, to cause the user device authorization unit to automatically generate said first encoded identifier, second encoded identifier and third encoded identifier, as well as to send queries to the TV set processor device for receiving, from the TV set memory unit, said data about the plurality of web-cameras connected to the server, data about processing types of the streaming video, which could be performed by the processing unit, a catalog to said library of the multimedia data and data about processing types of such multimedia data, which could be performed by the processing unit, as well as said data about the at least one web-camera and the processed streaming video that has been displayed therefrom within a period of time on said display device.

12. The system according to claim 11, characterized in that the user device is equipped with a user device graphical interface for displaying said data about the plurality of web-cameras connected to the server, data about processing types of the streaming video, which could be performed by the processing unit, a catalog to said library of the multimedia data, data about processing types of such multimedia data, which could be performed by the processing unit, as well as said data about the at least one web-camera and the processed streaming video that has been displayed therefrom within a period of time on said display device.

13. The system according to claim 12, characterized in that the user device is structurally embedded into the TV set control unit, while the user device graphical interface is configured to be partially or fully displayed on the display device.

14. The system according to claim 12, characterized in that the user device is a smartphone, a tablet or a laptop connected to the TV set processor device to form a network, while the user device graphical interface is configured to be partially or fully displayed on a screen of the smartphone, tablet or laptop.

15. The system according to claim 14, characterized in that it comprises one TV set and a plurality of the user devices connected to the TV set processor device to form a network through a TV set network interface device that is configured to provide a restricted access for each user device authorization unit.

16. The system according to claim 1, characterized in that it comprises a plurality of TV sets connected to the server to form a network through a server network interface device that is configured to provide a restricted access for the processor devices of the plurality of TV sets.

17. The system according to claim 1, characterized in that the first identifier comprises a user name, a number designation of at least one web-camera, a number designation of at least one processing type of the streaming video therefrom and an address of the TV set processor device, all of which are encoded by elements of cryptographic keys when sending to the server.

18. The system according to claim 1, characterized in that the second identifier comprises a user name, a number designation of the at least one web-camera in the plurality of web-cameras, a number of the processed streaming video that has been displayed therefrom within a period of time and an address of the TV set processor device, all of which are encoded by elements of cryptographic keys when sending to the server.

19. The system according to claim 6, characterized in that the third identifier comprises a user name, a number designation of the at least one piece of said multimedia data, a number designation of the at least one processing type thereof, and an address of the TV set processor device, all of which are encoded by elements of cryptographic keys when sending to the server.

* * * * *